(12) United States Patent
Shrivastava et al.

(10) Patent No.: US 9,438,404 B2
(45) Date of Patent: Sep. 6, 2016

(54) GROUP RESOURCE ALLOCATION SYSTEMS AND TECHNIQUES

(75) Inventors: Shweta Shrivastava, Beaverton, OR (US); Rath Vannithamby, Portland, OR (US); Vijay Sarathi Kesavan, Hillsboro, OR (US); Hongmei Sun, Beijing (CN); Wey-Yi W. Guy, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 605 days.

(21) Appl. No.: 12/655,159

(22) Filed: Dec. 23, 2009

(65) Prior Publication Data

US 2011/0149760 A1    Jun. 23, 2011

Related U.S. Application Data

(60) Provisional application No. 61/156,882, filed on Mar. 3, 2009.

(51) Int. Cl.

| H04L 5/00 | (2006.01) |
| H04L 1/00 | (2006.01) |
| H04L 1/06 | (2006.01) |
| H04W 4/08 | (2009.01) |
| H04W 28/06 | (2009.01) |
| H04W 28/18 | (2009.01) |
| H04W 72/00 | (2009.01) |
| H04W 72/04 | (2009.01) |

(52) U.S. Cl.
CPC .......... *H04L 5/0057* (2013.01); *H04L 1/0003* (2013.01); *H04L 1/0007* (2013.01); *H04L 1/0009* (2013.01); *H04L 1/0026* (2013.01); *H04L 1/0027* (2013.01); *H04L 5/006* (2013.01); *H04L 5/0082* (2013.01); *H04L 5/0096* (2013.01); *H04W 72/005* (2013.01); *H04L 1/06* (2013.01); *H04L 5/0023* (2013.01); *H04L 5/0037* (2013.01); *H04L 5/0053* (2013.01); *H04W 4/08* (2013.01); *H04W 28/06* (2013.01); *H04W 28/18* (2013.01); *H04W 72/00* (2013.01); *H04W 72/04* (2013.01)

(58) Field of Classification Search
USPC .................................. 370/328, 329, 330, 335
See application file for complete search history.

(56) References Cited

U.S. PATENT DOCUMENTS

| 2003/0081692 | A1 | 5/2003 | Kwan et al. |
| 2003/0147474 | A1 | 8/2003 | Ha et al. |
| 2008/0062936 | A1 | 3/2008 | He et al. |
| 2008/0085703 | A1* | 4/2008 | Michaelsen et al. ...... 455/422.1 |
| 2008/0117867 | A1 | 5/2008 | Yin et al. |
| 2008/0228878 | A1 | 9/2008 | Wu et al. |
| 2008/0233966 | A1* | 9/2008 | Scheim ................. H04L 5/0023 455/452.1 |
| 2009/0154588 | A1* | 6/2009 | Chen et al. ................... 375/267 |
| 2009/0161613 | A1 | 6/2009 | Kent et al. |
| 2011/0075752 | A1* | 3/2011 | Zheng et al. ................. 375/267 |

OTHER PUBLICATIONS

Lim, Jason Junsung et al., "Group Resrouce Allocation for 802.16m", Mar. 2, 2009, IEEE C802.16m-09/0601, 15 pages.*
Examination Report received for United Kingdom Patent Application No. 1021755.2, mailed on Apr. 25, 2012, 8 pages.

(Continued)

*Primary Examiner* — Feben M Haile

(57) ABSTRACT

Embodiments of systems and methods for group resource allocation are generally described herein. Other embodiments may be described and claimed.

13 Claims, 6 Drawing Sheets

(56) References Cited

OTHER PUBLICATIONS

Lim et al., "Group Resource Allocation for 802.16m", IEEE C802.16m-09/0601r1 (Rev.9), Mar. 10, 2009, 18 pages.
Vannithamby et al., "CQI Feedback Framework—Details", IEEE C802.16m-08/710r1, Jul. 7, 2008, pp. 1-8.
Vannithamby et al., "Proposal for IEEE 802.16m CQI Feedback Framework", IEEE C802.16m-08/391, May 5, 2008, pp. 1-8.
Combined search and examination report received for United Kingdom Patent Application No. GB1021755.2, mailed on Apr. 20, 2011, 6 pages.

* cited by examiner

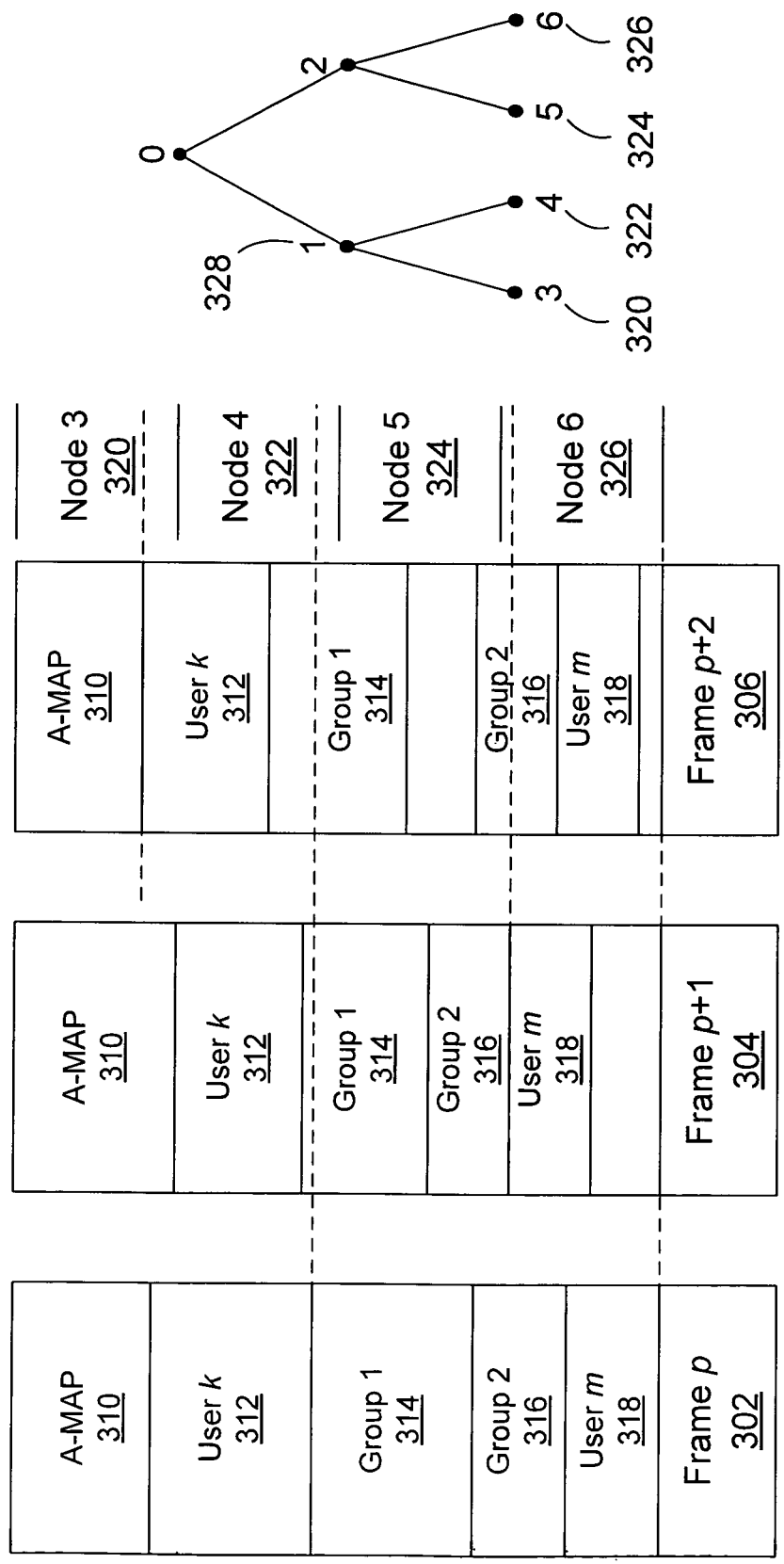

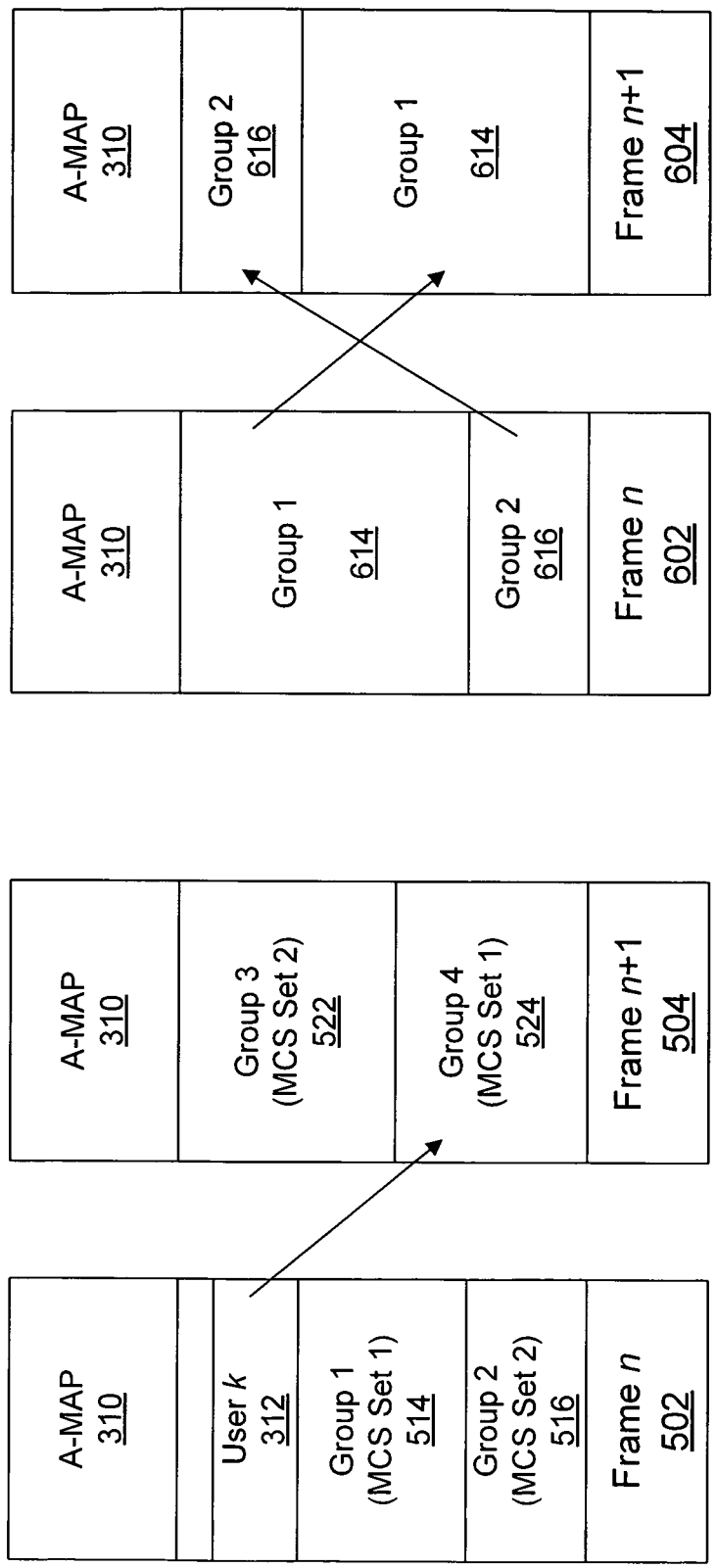

GROUP RESOURCE ALLOCATION SYSTEMS AND TECHNIQUES

RELATED CASE

This application claims priority to U.S. Provisional Patent Application No. 61/156,882, filed on Mar. 3, 2009, the entirety of which is hereby incorporated by reference.

TECHNICAL FIELD

The present disclosure relates generally to the field of wireless communications and more particularly to methods and related systems for group resource allocation (GRA) in a wireless environment.

BACKGROUND

Electronics Mobile Worldwide Interoperability for Microwave Access (WiMAX) is a broadband wireless technology for fixed and mobile broadband networks to enable broadband data services including data, streaming video, and voice. The robustness to severe interference and fast detection of the synchronization channel or synchronization preamble is crucial to fast cell selection, system timing and frequency acquisition cell coverage, and cell edge performance, as well as scan latency for the mobile stations.

Mobile WiMAX systems may operate in accordance with standards such as the Institute for Electronic and Electrical Engineers (IEEE) 802.16e-2005 standard, "Air Interface for Fixed and Mobile Broadband Wireless Access Systems," (February, 2005) and, its evolution, the IEEE 802.16m standard, "Advanced Air Interface." IEEE 802.16m (mobile WiMAX) standard specifies a group resource allocation (GRA) mechanism to provide resource allocations to multiple users as a group wherein each user group is identified by a group ID. The use of GRA is typically directed to flows made up of small packets, such as those packets used in voice over Internet protocol (VoIP), resulting in a large number of users scheduled in a particular frame. The group ID is unique per frame, which limits only one group with a given set of parameters to be allocated in the frame.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a block diagram of frames in accordance with some embodiments of the invention;

FIG. 4 is a hierarchical tree diagram corresponding to frames of FIG. 3 in accordance with some embodiments of the invention;

FIG. 5 is a block diagram that illustrates user movement or repositioning over a series of frames in accordance with some embodiments of the invention;

FIG. 6 is a block diagram that illustrates user group movement or repositioning over a series of frames in accordance with some embodiments of the invention;

Figure 1:
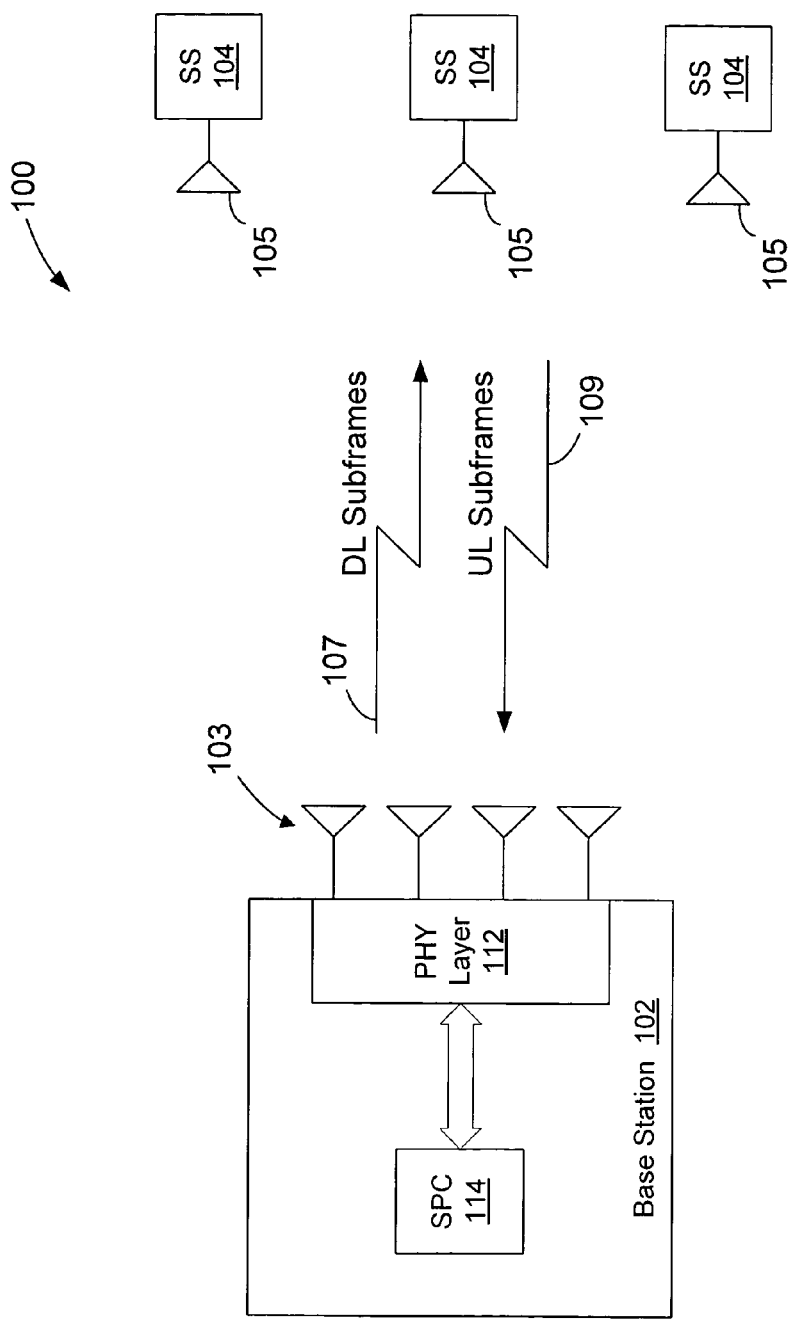
FIG. 1 is a wireless access network in accordance with some embodiments of the invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for providing group resource allocation (GRA) in a wireless environment are set forth to provide a thorough understanding of the invention. However, it will be understood by those skilled in the art that the present invention may be practiced without these specific details. In other instances, well-known methods, procedures, components and circuits have not been described in detail so as not to obscure the present invention.

It would be an advance in the art to provide GRA systems and techniques for fixed and/or mobile wireless access including broadband access in a wireless environment comprising multiple subscriber stations (SS) and/or mobile stations (MS), herein collectively referred to as stations (STA), access points, and/or base stations wherein groups of users are associated based on parameters specific to each group. The parameters shared within each group may include a set of modulation and coding schemes (MCS), resource sizes, burst sizes, multiple input multiple output (MIMO) modes, and other signal characteristics. The GRA systems and techniques may be used to allocate resources to multiple users as a group to save control overhead.

Each group is identified by a group identification (ID). Each group ID can serve as an identifier for a set of parameters shared by each group. Frames transferred between the stations (STA), base station, and/or access points (AP) may comprise multiple groups of users. The frames comprise control information, referred to here as MAP or A-MAP, and one or more hybrid automatic repeat request (HARQ) bursts wherein each burst corresponds to one user. It would be useful to provide methods to form and transmit a frame comprising multiple groups for wireless communication, wherein at least two of the groups in the same frame share a common set of parameters.

Additionally, fixed and/or mobile wireless access in a wireless environment comprising multiple STAs, base stations, and/or APs may include channel quality indicator (CQI) feedback to assist in allocation of an appropriate MCS for transmissions between a STA and base station using a best possible sub-channel or sub-band for the transmissions. In one embodiment, the use of CQI feedback to assist in allocation of an appropriate MCS is a link adaptation technique and using the best possible sub-channel or sub-band is a frequency selectivity technique provided to improve a spectral efficiency of a wireless system. The CQI feedback may be communicated using a method such as wideband communication using an average feedback over all sub-bands, narrowband communication using individual feedback for all sub-bands, best-m feedback using feedback over preferred sub-bands, and hierarchical communication, wherein a hierarchical tree having a series of layers is formed from a set of sub-bands and feedback may be provided on any of the levels of the hierarchical tree. These methods are not an efficient way to communicate CQI feedback information for flows comprising small packets, which is common in embodiments using GRA with each frame comprising a large number of scheduled users. Use of a narrowband scheme is largely prohibitive considering an amount of CQI feedback generated from the users while wideband CQI information is not very useful in an application where small packets are used. Additionally, frequency selectivity can be difficult to achieve when using GRA. It would be useful to provide methods to efficiently transfer CQI feedback with GRA and to provide mechanisms to perform coarse-level frequency selectivity with GRA.

Further, fixed and/or mobile wireless access in a wireless environment comprising multiple STAs, base stations, and/or APs may use a GRA mechanism to allocate resources to a group of users to save control/map (MAP) overhead and to increase network capacity. As indicated, a group of users may share common parameters such as MCSs, resource sizes, burst sizes, and MIMO modes. A user in the group of users has a MCS belonging to a set of MCSs and a resource size belonging to a set of resource sizes. Each set is identified by a Set ID and individual values within the set are assigned a code.

A specific MCS and resource size for a user in a given frame may be signaled by using a bitmap in a MAP. GRA makes use of bitmaps to signal resource allocation information for users within a group. The bitmaps may be sent in a GRA information element (IE). The bitmap uses n-bit code to signal the MCS and m-bit code to signal the resource size for each user. A total possible combination of all MCSs and resource sizes is a matrix of N×M. It would be useful to provide methods to choose effective combinations of the common parameters shared by the group of users to reduce the number of sets and bits required for codes representing the effective combinations.

Now turning to the figures, FIG. 1 illustrates a wireless access network in accordance with some embodiments. Network 100 includes base station 102 and one or more stations (STA) 104, wherein the stations 104 may be subscriber stations (STA) and/or mobile stations (MS). In multiple-access embodiments, base station 102 communicates with subscriber stations 104 by transmitting within downlink (DL) subframes 107 and subscriber stations 104 communicate with base station 102 by transmitting within uplink (UL) subframes 109. Base station 102 may include one or more MAPs in downlink subframes 107 to indicate the particular time and frequency resource that each subscriber station 104 may receive information within the current downlink subframe and the particular time and frequency resource that each subscriber station 104 may transmit information within a next uplink subframe.

Base station 102 may include, among other things, physical (PHY) layer circuitry 112 to communicate signals with subscriber stations 104, and signal processing circuitry (SPC) 114 to process the signals received from subscriber stations 104 and to process signals for transmission to subscriber stations 104. In some embodiments, physical layer (PHY) circuitry 112 may be configured to receive orthogonal sequences over a bandwidth request contention channel from subscriber stations 104. Signal processing circuitry (SPC) 114 may detect and/or decode the received signals to allocate uplink bandwidth to subscriber stations 104.

In some embodiments, base station 102 and subscriber stations 104 may communicate using a multicarrier communication technique that uses orthogonal frequency division multiplexed (OFDM) communication signals. The OFDM signals may comprise a plurality of orthogonal subcarriers. In some of these multicarrier embodiments, base station 102 may be part of a broadband wireless access (BWA) network communication station, such as a Worldwide Interoperability for Microwave Access (WiMax) communication station, although the scope of the invention is not limited in this respect. Subscriber stations 104 may be BWA network communication stations, such as WiMax subscriber stations, although the scope of the invention is not limited in this respect. In some embodiments, base station 102 and subscriber stations 104 may communicate using a multiple access technique, such as orthogonal frequency division multiple access (OFDMA). Subscriber stations 104 may each be almost any portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, base station 102 and subscriber stations 104 may communicate in accordance with specific communication standards, such as the Institute of Electrical and Electronics Engineers (IEEE) standards including the IEEE 802.16-2004 and the IEEE 802.16(e) standards for wireless metropolitan area networks (WMANs) including variations and evolutions thereof, although the scope of the invention is not limited in this respect as they may also be suitable to operate in accordance with other techniques and standards. In some embodiments, base station 102 and subscriber stations 104 may operate in accordance with the provisions of the IEEE 802.16(m) task group. For more information with respect to the IEEE 802.16 standards and task groups, please refer to "IEEE Standards for Information Technology—Telecommunications and Information Exchange between Systems"—Local and Metropolitan Area Networks—Specific Requirements—Part 16: "Air Interface for Fixed Broadband Wireless Access Systems," May 2005 and related amendments/versions. In some embodiments, base station 102 and subscriber stations 104 may communicate in accordance with the 3GPP LTE standards.

Antennas 103 and 105 may each comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna 103 or 105. Although subscriber stations 104 are illustrated with only a single antenna 105, each subscriber station 104 may include more than one antenna.

Some embodiments of the invention may be used in a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry®, Palm Treo®), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, or the like. Embodiments of the invention may be used in various other devices, systems and/or networks.

Figure 2:
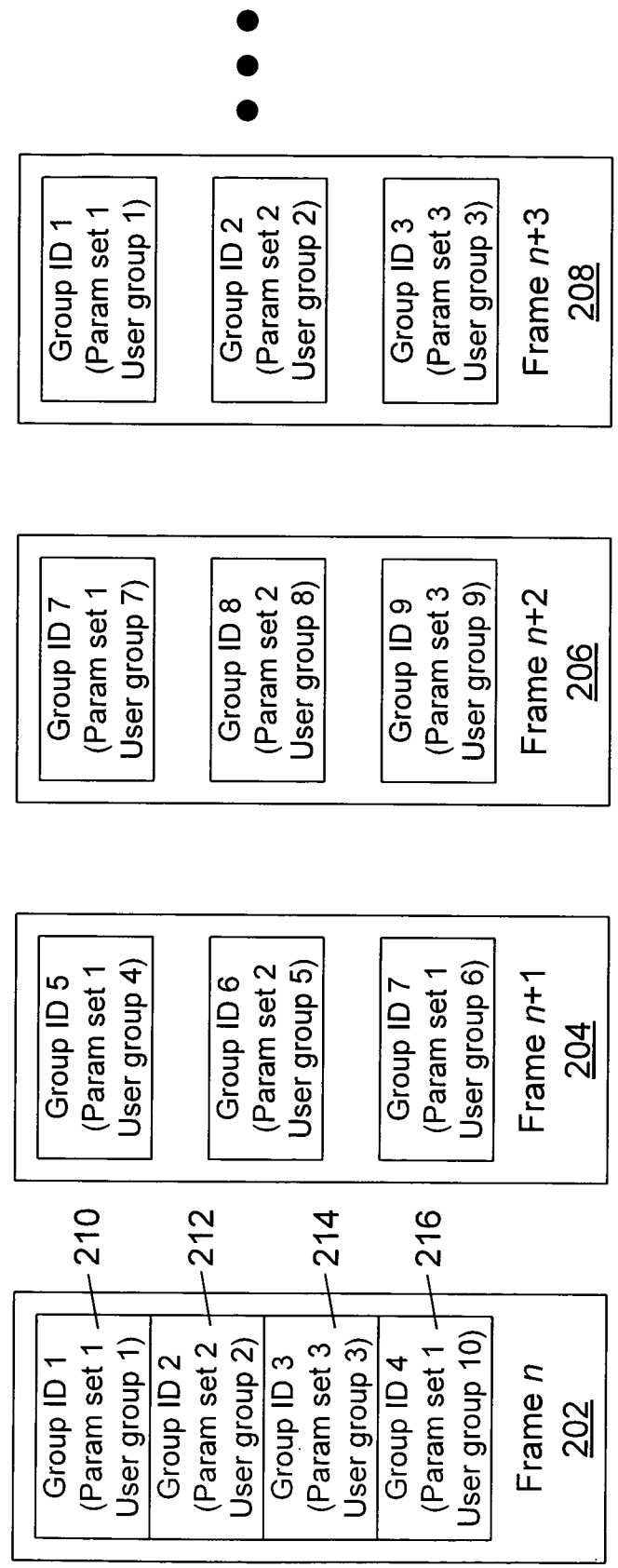
FIG. 2 is a block diagram of frames in accordance with some embodiments of the invention.

FIG. 2 is a block diagram of frames used for signaling resource allocation information and sending corresponding data for groups of users in accordance with some embodiments of the invention where a parameter set ID is established independently of a user group ID. Group resource allocation (GRA) is used to provide resource allocations to multiple users per group where each group corresponds to a set of parameters such as MCSs, resource size, burst size, MIMO mode, and other signal characteristics. The groups of users are established based at least in-part on parameters specific to each group. Multiple groups per frame, with each group having a unique group ID, may be grouped together wherein a parameter set may be common to more than one group per frame. Hence different group IDs may be used for different groups corresponding to the same parameter set. If a user or SS 104 loses synchronization with the frames, the SS104 can sync back with its assigned allocation by looking for the SS104 unique group ID.

Frames including Frame n 202, Frame n+1 204, Frame n+2 206, and Frame n+3 208 are transferred between the STA, base station, and/or AP and comprise one or more sub-frames per frame. In this embodiment, frame n 202 comprises a first subframe 210, a second subframe 212, a third subframe 214, and a fourth subframe 216 each with multiple users. In another embodiment, a subframe and group do not necessarily have one to one correspondence. For example, each subframe may have one or more groups. The group ID is assigned to a group of users with common attributes and the parameter set ID is associated with attributes of a particular parameter set, which corresponds to that group.

Each parameter set may be differentiated based on the types of attributes shared amongst the group of users, such as MCS, resource size, burst size, MIMO mode, and signal characteristics. Each type of parameter may have a specific identifying set ID, such as a MCS set ID and a resource size set ID. Alternatively, the parameters may be combined to provide parameter IDs such as a MCS/resource size set ID or a MCS/MIMO mode set ID. In an embodiment, the parameter sets may be predetermined or dynamically configured by the BS 102, by the STA 104, or by some combination thereof. Independent of where the parameter sets are configured, a parameter ID will correspond to a parameter set for a particular user group. If the parameter sets are configured by the BS 102, information about the parameter sets is signaled by the BS 102 to the users using a transmission mode such as unicast, multicast, or broadcast messaging. In an embodiment, information about the parameter set IDs corresponding to a particular user group will be signaled by the BS 102 either when a new STA 104 is added to a group or included in the resource allocation information transmitted by the BS 102.

For example, in Frame n 202, user group 1 is represented by Group ID 1 and Parameter set 1. user group 2 is represented by Group ID 2 and Parameter set 2 and user group 3 is represented by Group ID 3 and parameter set 3. User groups 1, 2 and 3 all have different parameter sets. However, user group 10 is represented by Group ID 4 and parameter set 1, the same parameter set that is used by user group 1 in Frame n 202.

As shown in FIG. 2, more than one group per frame is allowed wherein different groups of users share a common parameter set while decoupling the parameter set ID from the group ID to allow multiple groups within the same frame to use the common parameter set. Another example is shown in FIG. 2, where the Frame n+1 204 comprises multiple groups with a common parameter set 1. This embodiment may further eliminate a necessity of the STA 104 to keep track of frames in which the STA 104 will receive resource allocations. The GRA may further be periodic or non-periodic over a series of frames.

The frame n 202 may be formed using GRA to provide resource allocations to multiple users per group by forming a first group of users and a second group of users that use a common parameter set, or a first parameter set using the signal processing circuitry 114. A first user group 1 is generated in the frame n 202 having a first group identification (ID) number for the first group of users, wherein user group 1 is assigned the first parameter set. A second user group 2 is generated in the frame n 202 having a second group ID number for the second group of users wherein the second user group 2 is assigned the first parameter set. The first parameter set may then be signaled or transmitted to the first group of users and the second group of users. The first parameter set comprises a parameter set ID to indicate at least one of a MCS, a resource size, a burst size, and a MIMO mode. Further, the first parameter set may be signaled using a unicast, a multicast, or a broadcast message using the PHY layer circuitry 112.

FIG. 3 is a block diagram of frames used for providing channel quality indicator (CQI) feedback for a STA 104 in accordance with some embodiments of the invention where CQI feedback is performed using hierarchical feedback in a manner that is useful for GRA. These embodiments further provide mechanisms to perform coarse-level frequency selectivity with GRA.

The CQI feedback may assist in allocation of an appropriate MCS for transmissions between a STA 104 and base station 102 using a best possible sub-channel or sub-band for the transmissions. In one embodiment, the use of CQI feedback to assist in allocation of an appropriate MCS is a link adaption technique and using the best possible sub-channel or sub-band is a frequency selectivity technique provided to improve a spectral efficiency of a wireless system. Frequent hierarchical reporting for subbands that a particular STA 104 is likely to use can provide CQI feedback to help the base station 102 with link adaption for that STA 104. In addition, less frequent best-m feedback over other subbands can provide additional CQI feedback to help the base station 102 perform frequency selectivity.

As illustrated in FIG. 3, user k 312 and user m 318 are scheduled across Frame p 302, Frame p+1 304, and Frame p+2 306. User k 312 and user m 318 perform frequent hierarchical reporting for link adaption wherein the reporting frequency may be established by the base station 102, or alternatively by the STA 104. The reporting frequency may further be based at least in-part on a periodicity of group allocation for the STA 104. In an embodiment, if the STA 104 is provided group allocation once every four frames, then the CQI reporting can be performed at a frequency of once every four frames. The frequency may be faster or slower based on link adaption requirements. The STA 104 may determine a level or node in a hierarchical tree, such as the hierarchical tree of FIG. 4, over which the STA 104 will perform CQI reporting. The STA 104 may consider a plurality of factors when determining at what node to report. For example, the STA 104 may determine what subband the STA 104 was last allocated and may also consider its current MCS to determine how many subbands the STA 104 will occupy. These factors can allow the STA 104 to determine which subbands the STA 104 is likely to use. Based on this information, the STA 104 can determine which node in the hierarchical tree with which the subbands correspond.

Returning to FIG. 3, user k 312 and user m 318 are scheduled across Frame p 302, Frame p+1 304, and Frame p+2 306. In this embodiment, user k 312 is scheduled across subbands corresponding to node 3 (320) and node 4 (322), further illustrated in the hierarchical tree FIG. 4. User k 312 can move up the hierarchical tree of FIG. 4 to report a CQI value on node 1 (328), which may represent an average of node 3 (320) and node 4 (322). User m 318 may stay within the subband corresponding to node 6 (326) and report a CQI value of node 6 (326). In one embodiment, the hierarchical reporting of CQI values comprises two values; the node number(s) in the hierarchical tree represented by the CQI value and the CQI value for that node or nodes.

In combination with the hierarchical reporting of FIG. 3 and FIG. 4, the STA 104 can perform less frequent best-m reporting where the STA 104 reports CQI over best-m subband(s) where m may be determined by the STA 104, the base station 102, or some combination thereof. The best-m reporting may be periodically triggered as a function of time or triggered as a result of an event. For example, an event trigger may be a result of enhanced channel conditions in alternate subbands or the detection of very bad channel conditions in subbands already used by the STA 104. In response, the base station 102 may choose to schedule the STA 104 in channels with relatively better CQI.

CQI values, information or feedback may be provided by establishing a reporting frequency for the CQI feedback wherein the reporting frequency may be established by the base station 102 or the station 104. A first node in a hierarchical tree is selected to report the CQI feedback wherein determining the first node in the hierarchical tree is based upon at least on of determining which subbands the STA 104 was last allocated and a current MCS for the STA 104. A subband or subbands that correlate with the first node is determined and the STA 104 associates with a first group of users that operate over the subband or subbands. The CQI feedback is reported in a first frame wherein the CQI feedback includes a node value of the first node and a CQI value for link adaption purposes. It is then determined whether the STA 104 reports the CQI feedback over a second node in the hierarchical tree either by the base station 102 or the STA 104.

The STA 104 then associates with a second group of users, wherein the second group of users share the same parameter set as the first group of users, in a second frame based at least on part on the CQI feedback of the first frame using best-m reporting. The STA 104 may report the CQI feedback over a second set of subbands in the second frame based on the STA 104 channel quality statistics. Alternately, the STA 104 may report the CQI feedback over the second set of subbands in the second frame based on average statistics, wherein the base station 102 computes an average channel quality first the first group of users in a first set of subbands of the first node and for the second group of users in the second set of subbands based on best-m reporting. If the average channel conditions are better in a different subband or subbands, the base station 102 may decide to schedule the whole group in a new set of subbands.

In one embodiment, the base station 102 may choose to move the user or STA 104 to another group, in another frame that is scheduled in a different set of subbands, based on CQI feedback provided by the STA 104. As illustrated in FIG. 5, user k 312 of Group 1 (514) in Frame n (502) is moved to Group 4 (524) of Frame n+1 (504) based at least in part on channel conditions or CQI of Group 2 (516) of Frame n (502). In this embodiment, the base station 102 first determines that parameters such as MCS, resource size, burst size, and MIMO mode are matched between Group 1 (514) and Group 4 (524).

In another embodiment, the base station 102 determines that average channel conditions for a first subband or a first plurality of subbands and a second subband or a second plurality of subbands, such as through best-m reporting. If the channel conditions or CQI for the second subband or second plurality of subbands are better than the first subband or first plurality of subbands, the base station 102 may schedule a group of users in the second subband or second plurality of subbands, as illustrated in FIG. 6. Group 1 (614) of Frame n 602 may be moved based on average channel statistics to a different band or subbands of Frame n+p 604, where p is the periodicity of group resource allocation, and Group 2 (616) of Frame n 602 may be moved based on average channel statistics to a different band or subbands of Frame n+p 604. A frequency of the best-m reporting may be less than a frequency of the hierarchical reporting.

Effective combinations of modulation and coding schemes (MCS) and resource sizes may be chosen through use of a matrix, wherein the matrix comprises available MCS and packet sizes or media access control (MAC) protocol data unit (MPDU) sizes. A first MCS is identified and a corresponding MPDU size is determined for the first MCS. A first resource size for the first MCS and the first MPDU size is calculated to form a first MCS and resource size combination, wherein the first resource size is made up of logical resource units (LRU). It is determined if the first MCS and resource size combination is in the matrix and also determined if, for the first MPDU size, the first resource size is in the matrix with a more robust MCS than the first MCS. A parameter set is derived from the effective combinations of MCS and MPDU sizes. A total number of bits required per user in a bitmap to signal all possible combinations may be expressed as: $b = \text{ceiling}(\log_2(N \times M))$. However, deriving the number of effective combinations allows a minimal number of bits to be used to represent the parameter set. The parameter set may then be transmitted to the station 104 of FIG. 1.

Figure 7:
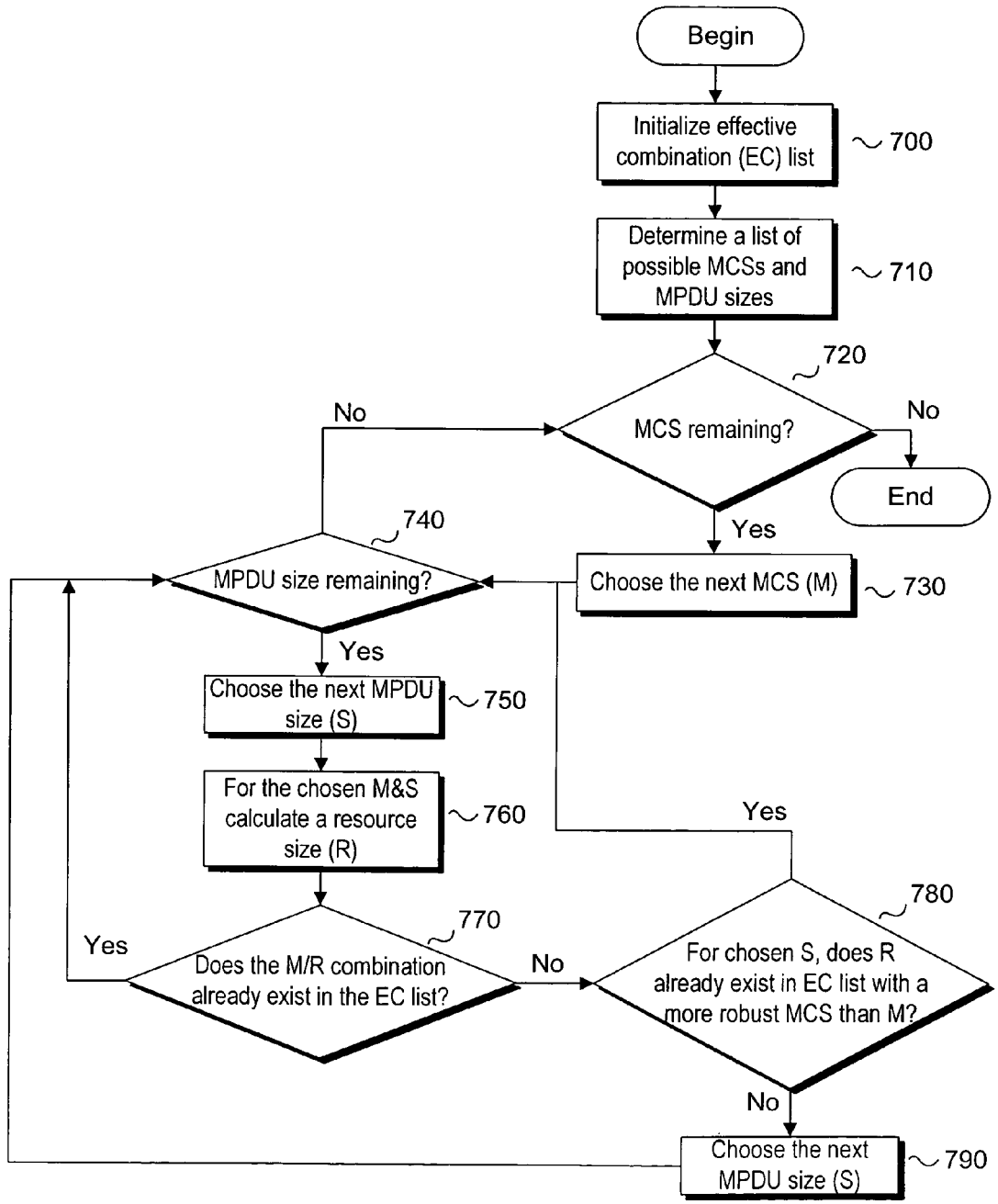
FIG. 7 is a flowchart that describes an embodiment of a method to facilitate formation of user groups in accordance with some embodiments of the invention.

FIG. 7 is a flowchart that describes an embodiment of a method to facilitate formation of user groups in accordance with some embodiments of the invention. One task used in the formation of the user groups is a creation of parameter sets. Creation of the parameter sets can occur through execution of an algorithm at the base station 102 with resulting parameter set information sent to available STA 104 through a unicast, multicast, and/or broadcast message. Alternately, the execution of the algorithm may be performed at the base station 102 and the STA 104, wherein the base station 102 and the STA 104 each derive available parameter sets based at least upon possible MCS and resource sizes.

In reference to FIG. 7, an effective combination (EC) list is initialized in element 700 and a list of possible MCSs and MAC protocol data unit (MPDU) sizes is generated in element 710. Given the list of possible MCSs (720), a MCS (M) in element 730 is considered along with a list of possible MPDU sizes (740) and a MPDU size in element 750 is selected. A resource size (R) for the given MCS and MPDU is calculated in element 760. Derivation of resource sizes (R) for all available MCSs and MPDUs results in a resource size matrix. An embodiment of a resource size matrix for four MCS and four MPDUs is illustrated in Table 1. However, the embodiment is not so limited. Alternate MCSs, such as binary phase shift keying (BPSK), differential phase shift keying (DPSK), and MDPU sizes may alternately be used.

TABLE 1

Resource Size List

| MCS | MPDU Size (Bytes) | | | |
|---|---|---|---|---|
| | 40 | 45 | 50 | 73 |
| QPSK 166/256 | 3 | 3 | 4 | 5 |
| QPSK 199/256 | 3 | 3 | 3 | 4 |
| 16QAM 123/256 | 2 | 2 | 3 | 4 |
| 16QAM 149/256 | 2 | 2 | 2 | 3 |

With continuing reference to FIG. 7, effective combinations of MCS and resource sizes are derived in element 780 by comparing resource sizes for the available MCSs to generate a number of effective combinations. The effective combinations allow the most efficient use of logical resource units (LRU), or resource size, and also reduce the number of bits needed to code the possible combinations. The algorithm continues in element 790 for the available MPDU sizes (S). The effective combinations are derived in one embodiment by eliminating redundant combinations so that for a given MPDU size, only those MCSs are chosen which are the most robust for a given resource size. The most robust MCS makes the most efficient use of the LRU.

For example, an MPDU size of 40 with a MCS of quadrature phase shift key (QPSK) 166/256 and QPSK 199/256 both require a resource size of 3. In this example, it is, more reasonable to eliminate the use of QPSK 199/256 because QPSK 166/256 provides more reliable transmission without using additional resources with efficient utilization of logical resource units. For a given MCS, a given resource size is chosen only once when the same combination exists for multiple MPDU sizes.

Once the effective combination list is generated, the combinations are divided into resulting parameter sets. The resulting parameter sets should have a reasonable number of contiguous combinations per parameter set, wherein the contiguous combinations are successive combinations resulting from the method illustrated in FIG. 7 where MCSs are in increasing order of efficiency and MPDU sizes are in increasing order of size. A reasonable number of contiguous combinations per parameter set may be predetermined or determined using system conditions. Different combinations of a same MCS should not belong to different parameter sets. Further, the resulting number of sets should be the minimum number that can be supported for the number of bits used to represent each combination and the resulting sets are assigned set IDs. A list of effective combinations of MCS and MPDU sizes of Table 1—Resource Size List as derived through the method illustrated in FIG. 7 is illustrated in Table 2.

TABLE 2

Effective combinations

| MCS | Resource Size | Code |
|---|---|---|
| QPSK 166/256 | 3 | 000 |
| QPSK 166/256 | 4 | 001 |
| QPSK 166/256 | 5 | 010 |
| QPSK 199/256 | 3 | 011 |
| QPSK 199/256 | 4 | 100 |
| 16QAM 123/256 | 2 | 101 |
| 16QAM 149/256 | 2 | 110 |
| 16QAM 149/256 | 3 | 111 |

Figure 8:
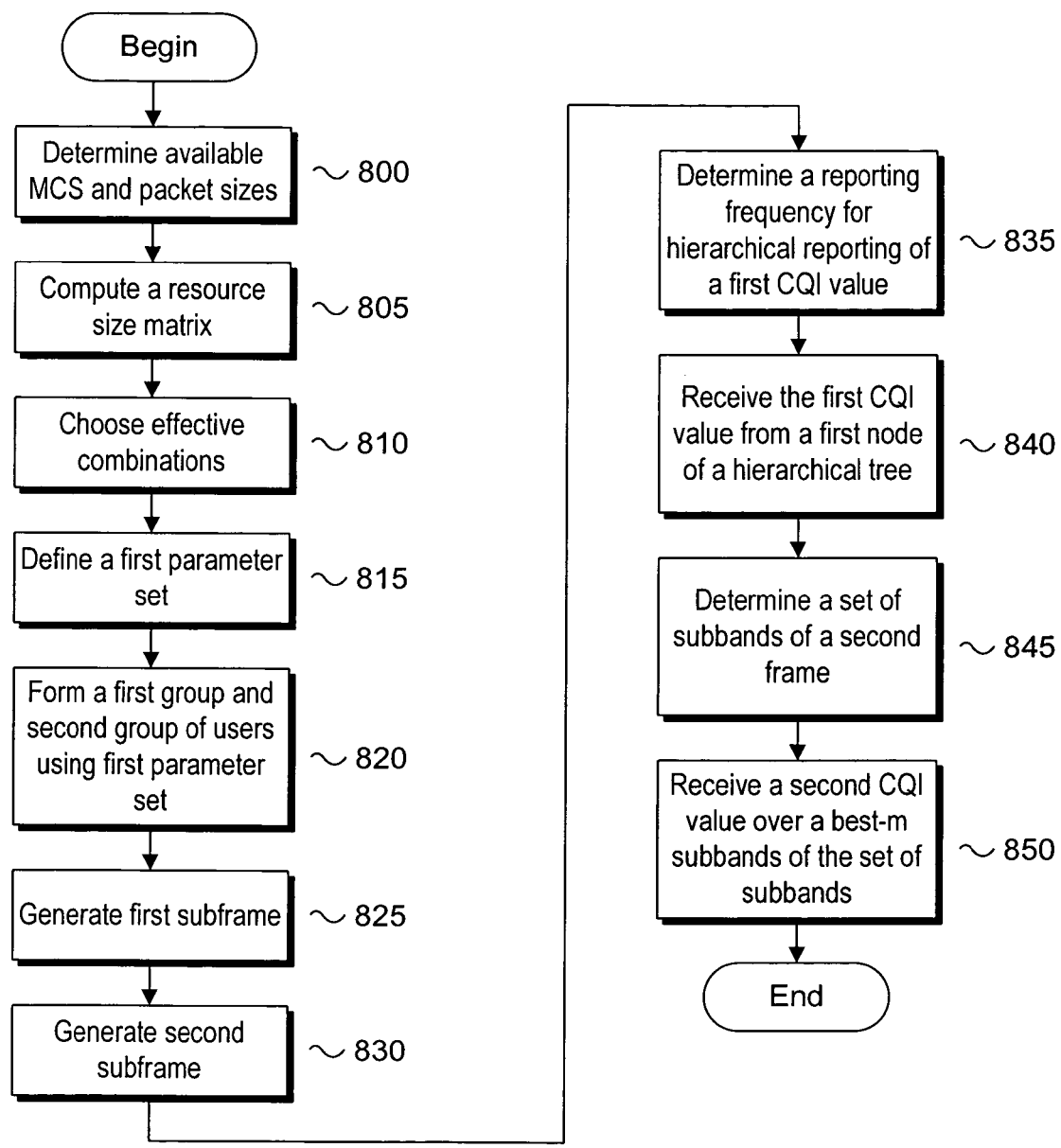
FIG. 8 is a flowchart that describes an embodiment for GRA in accordance with some embodiments of the invention.

FIG. 8 is a flowchart that describes a method for GRA in accordance with some embodiments of the invention. In element 800, available MCS and packet sizes are determined and a resource size matrix is computed or determined in element 805. Effective combinations of MCS and packet sizes are selected from the resource size matrix in element 810. A first parameter set is defined using the effective combinations of MCS and packet sizes in element 815. A first group of user that uses a first parameter set and a second group of users that use the first parameter set are formed in element 820. A first subframe in a first frame is generated in element 825 wherein the first subframe is assigned a first group ID number for the first group and wherein the first group uses a first parameter set. A second subframe in the first frame is generated in element 830 wherein the second subframe has a second group ID number for the second group and wherein the second group uses the first parameter set.

A reporting frequency is determined in element 835 for hierarchical reporting of a first CQI value. In element 840, a first CQI value is received over a first node of a hierarchical tree. In element 845, a set of subbands of a second frame are determined and a second CQI value is received over a best-m subbands of the set of subbands of the second frame in element 850.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by the STA 104 or base station 102, performs group resource allocation. The programs in the STA 104 or base station 102 may be considered components of a software environment.

The operation discussed herein may be generally facilitated via execution of appropriate firmware or software embodied as code instructions, as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for group resource allocation (GRA), comprising:
    determining, by circuitry, available modulation and coding schemes (MCS) and packet sizes;
    computing a resource size matrix;
    choosing effective combinations of MCS and packet sizes from the resource size matrix;
    defining a first parameter set using the effective combinations of MCS and packet sizes;
    forming a first group of users that use the first parameter set, the first group of users formed based at least in part on parameters specific to the first group of users;
    forming a second group of users that use the first parameter set;
    generating a first subframe group in a first frame having a first group identification (ID) number for the first group, wherein the first subframe group is assigned the first parameter set;
    generating a second subframe group in the first frame having a second group ID number for the second group, wherein the second subframe group is assigned the first parameter set;
    determining a reporting frequency for hierarchical reporting of a first channel quality indicator (CQI) value, wherein the reporting frequency is based at least in part on a periodicity of forming groups of users;
    receiving first CQI information over a first node of a hierarchical tree, the first CQI information to comprise the first CQI value and a node value of the first node;
    determining a set of subbands of a second frame; and
    receiving second CQI information over a best-m subbands of the set of subbands via best-m reporting that is periodically triggered, the second CQI information to comprise a second CQI value, a reporting frequency of the best-m reporting to be less than the reporting frequency of the hierarchal reporting.

2. The method of claim 1, wherein a minimal number of bits are used to represent the parameter set.

3. The method of claim 1, wherein the best-m subbands are determined by a base station.

4. A method of forming a frame using group resource allocation (GRA) to provide resource allocations to multiple users per group, comprising:
    forming, by circuitry, a first group of users that use a first parameter set, the first group of users formed based at least in part on parameters specific to the first group of users, the first parameter set to include a multiple input multiple output (MIMO) mode parameter;
    forming a second group of users that use the first parameter set;
    generating a first group in the frame having a first group identification (ID) number for the first group, wherein the first group is assigned the first parameter set;
    generating a second group in the frame having a second group ID number for the second group, wherein the second group is assigned the first parameter set;
    receiving channel quality indicator (CQI) feedback for the frame via hierarchal reporting, wherein the reporting frequency is based at least in part on a periodicity of forming groups of users; and
    receiving CQI feedback for a second frame via best-m reporting that is periodically triggered, a reporting frequency of the best-m reporting to be less than a reporting frequency of the hierarchal reporting.

5. The method of claim 4, further including signaling the first parameter set to the first group of users and the second group of users.

6. The method of claim 5, wherein the first parameter set comprises a parameter set ID to indicate at least one of a modulation and coding scheme (MCS), a resource size, and a burst size.

7. The method of claim 5, wherein the first parameter set is signaled to the first group of users and the second group of users using a unicast, a multicast, or a broadcast message.

8. A method for providing channel quality indicator (CQI) feedback for a station (STA), comprising:
    forming a first group of users that use the first parameter set, the first group of users formed based at least in part on parameters specific to the first group of users;
    forming a second group of users that use the first parameter set;
    establishing a reporting frequency for hierarchal CQI feedback reporting, wherein the reporting frequency is based at least in part on a periodicity of forming groups of users;
    determining a first node in a hierarchical tree to report first CQI feedback via the hierarchical CQI feedback reporting;
    determining a subband that correlates with the first node;
    associating with the first group of users in the subband;
    reporting the first CQI feedback in a first frame, the first CQI feedback to comprise a CQI value and a node value of the first node; and
    reporting second CQI feedback in a second frame using best-m CQI feedback reporting that is periodically triggered, a reporting frequency of the best-m CQI feedback reporting to be less than the reporting frequency of the hierarchical CQI feedback reporting.

9. The method of claim 8, wherein the determining the first node in the hierarchical tree is based upon at least one of determining which subbands the STA was last allocated and a current modulation and coding scheme (MCS) for the STA.

10. The method of claim 9, further including determining a second subband that correlates with the first node.

11. An wireless apparatus, comprising:
signal processing circuitry configured to:
- form a first group of users that use a first parameter set, the first group of users formed based at least in part on parameters specific to the first group of users, the first parameter set to include a multiple input multiple output (MIMO) mode parameter;
- form a second group of users that use the first parameter set;
- generate a first group in a frame having a first group identification (ID) number for the first group wherein the first group is assigned the first parameter set; and
- generate a second group in the frame having a second group ID number for the second group wherein the second group is assigned the first parameter set; and physical (PHY) layer circuitry to:
- signal the first parameter set to the first group of users and the second group of users;
- receive channel quality indicator (CQI) feedback for the frame via hierarchical reporting, wherein the reporting frequency is based at least in part on a periodicity of forming groups of users; and
- receive CQI feedback for a second frame via best-m reporting that is periodically triggered, a reporting frequency of the best-m reporting to be less than a reporting frequency of the hierarchal reporting.

12. The wireless apparatus of claim 11, wherein the PHY layer is configured to communicate using orthogonal frequency division multiple access (OFDMA) signals.

13. The wireless apparatus of claim 11, wherein the PHY layer is configured to communicate using a 802.16m (mobile WiMAX) standard.

* * * * *